United States Patent [19]
Yodaiken

[11] Patent Number: 5,995,745
[45] Date of Patent: Nov. 30, 1999

[54] ADDING REAL-TIME SUPPORT TO GENERAL PURPOSE OPERATING SYSTEMS

[76] Inventor: Victor J. Yodaiken, P.O. Box 638, Socorro, N.Mex. 87801

[21] Appl. No.: 08/967,146

[22] Filed: Nov. 10, 1997

Related U.S. Application Data

[60] Provisional application No. 60/033,743, Dec. 23, 1996.
[51] Int. Cl.[6] ................................................. G06F 9/455
[52] U.S. Cl. ............................ 395/500.47; 395/500.43; 709/103; 710/262
[58] Field of Search ........................... 395/500, 670, 395/677, 733, 735, 500.43, 500.44, 500.47; 709/100, 102, 103, 107; 710/260, 262

[56] References Cited

U.S. PATENT DOCUMENTS 4,553,202  11/1985  Trufyn ........................................ 710/269
4,993,017  2/1991   Bachinger et al. ...................... 370/360
5,291,614  3/1994   Baker et al. .............................. 712/35
5,721,922  2/1998   Dingwall ................................. 709/103

OTHER PUBLICATIONS

H. Lycklama et al., "UNIX Time–Sharing System: The MERT Operating System," The Bell System Technical Journal, vol. 57, No. 6, pp. 2049–2086, Jul.–Aug. 1978.

Primary Examiner—Kevin J. Teska
Assistant Examiner—Russell W. Frejd
Attorney, Agent, or Firm—Ray G. Wilson

[57] ABSTRACT

A general purpose computer operating system is run using a real time operating system. A real time operating system is provided for running real time tasks. A general purpose operating system is provided as one of the real time tasks. The general purpose operating system is preempted as needed for the real time tasks and is prevented from blocking preemption of the non-real time tasks.

11 Claims, 6 Drawing Sheets

ADDING REAL-TIME SUPPORT TO GENERAL PURPOSE OPERATING SYSTEMS

This application claims the benefit of U.S. provisional application Ser. No. 60/033,743 filed Dec. 23, 1996.

BACKGROUND OF THE INVENTION

This invention relates to real-time operating systems, and, more particularly, to running a real-time operating system with a general purpose operating system.

General purpose computer operating systems "timeshare" programs to optimize use of the machine or response time, or some other mix of objectives. Such programs cannot be used for control of instruments, robots, machine tools, communication devices, or other machinery that requires operation at "hard" real-time, i.e., precise timing where deadlines cannot be missed, because the systems are designed to optimize average performance of application programs at the expense of predictability. Performing the above tasks requires real-time support in the operating system: an ability to schedule tasks at precise intervals, no matter what other system tasks may be active. But real-time support can only be offered if the operating system can ensure (1) low interrupt latency (fast response) and (2) fully pre-emptive task switching. Low interrupt latency means that whenever a hardware device or the clock signals the processor, the operating system will execute a "handler" program within a short and bounded interval of time. Fully preemptive task switching means that whenever a high-priority real-time task is scheduled, it can be executed no matter what other tasks are currently executing.

An exemplary need is a controller for an instrument that measures electrical discharges in thunderstorms. It is desirable to read data from the instruments periodically, buffer and then write the data to disk, generate a graphical display of the data either locally or over the network, and possibly accept data from other instruments over the network. Only the first of these tasks requires hard real-time; the remainder are standard programming tasks for which a general purpose operating system is well suited.

Another exemplary need is the control of a liquid fueled rocket mounted on a test platform. There is a need to sample and display data on numerous channels, update a remote real-time display, accept emergency shutdown commands, and perform routing control operations. Again, most of the requirements are for conventional operating systems services, but there are hard real-time components that need reasonably precise scheduling. For example, the shutdown sequence must be precisely timed and cannot be delayed by lower priority tasks without spectacular and unwelcome results.

It is possible to design a special purpose operating system to support real-time, but this is an enormously complex, expensive and error-prone process that produces a system that needs a large continuing investment to remain current. In addition, there is substantial ongoing development effort and it is desirable to maintain compatibility with these developments, which are generally done by others.

Accordingly, it is an object of the present invention to operate a real-time operating system, or executive, and retain the capabilities offered by a general purpose operating system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention comprises a process for running a general purpose computer operating system using a real time operating system. A real time operating system is provided for running real time tasks. A general purpose operating system is provided as one of the real time tasks. The general purpose operating system is preempted as needed for the real time tasks.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

In accordance with the present invention, a real-time operating system, hereinafter called a RT-executive, runs a general purpose operating system as its lowest priority task, preempting it when needed. All operating systems have routines that enable and disable interrupts (or set interrupt levels). These routines are "captured" so that they pass through a small RT-executive and hardware emulator.

Figure 1A:
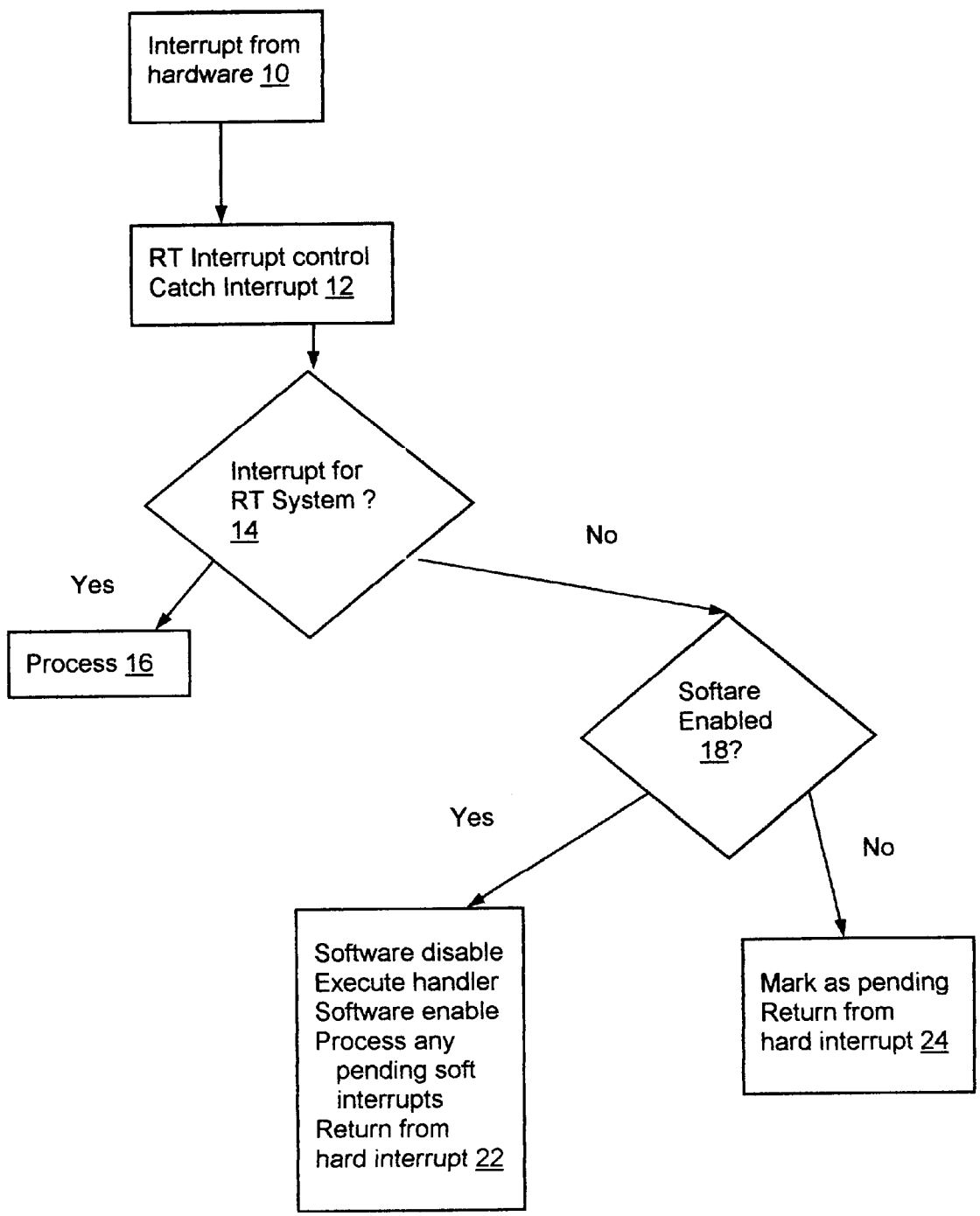
FIG. 1A is a software flow diagram for the process of the present invention.

Referring first to FIG. 1A, when the general purpose operating system attempts to disable hardware interrupts in accordance with the present invention, the emulator sets an indicator in software. When interrupts arrive 10, they are captured 12 by the RT-executive. The nature of the interrupt is then determined 14. If the interrupts cause a real-time task to be runnable, that task is started 16. If the interrupts are passed through to the general purpose operating system, the program determines if the software enable indicator is set 18. If the software enable indicator is set, then an interrupt is emulated 22 and the handler in the general purpose operating system is run. A handler is a software routine that processes a particular system interrupt. If the enabled indicator is not set 24 (i.e., is cleared), a software pending interrupt indicator is set. As conventionally used herein, the term "soft" interrupt is used to mean interrupts that are emulated in software by the RT-executive; the term "hard" interrupt means interrupts generated by hardware.

Figure 1B:
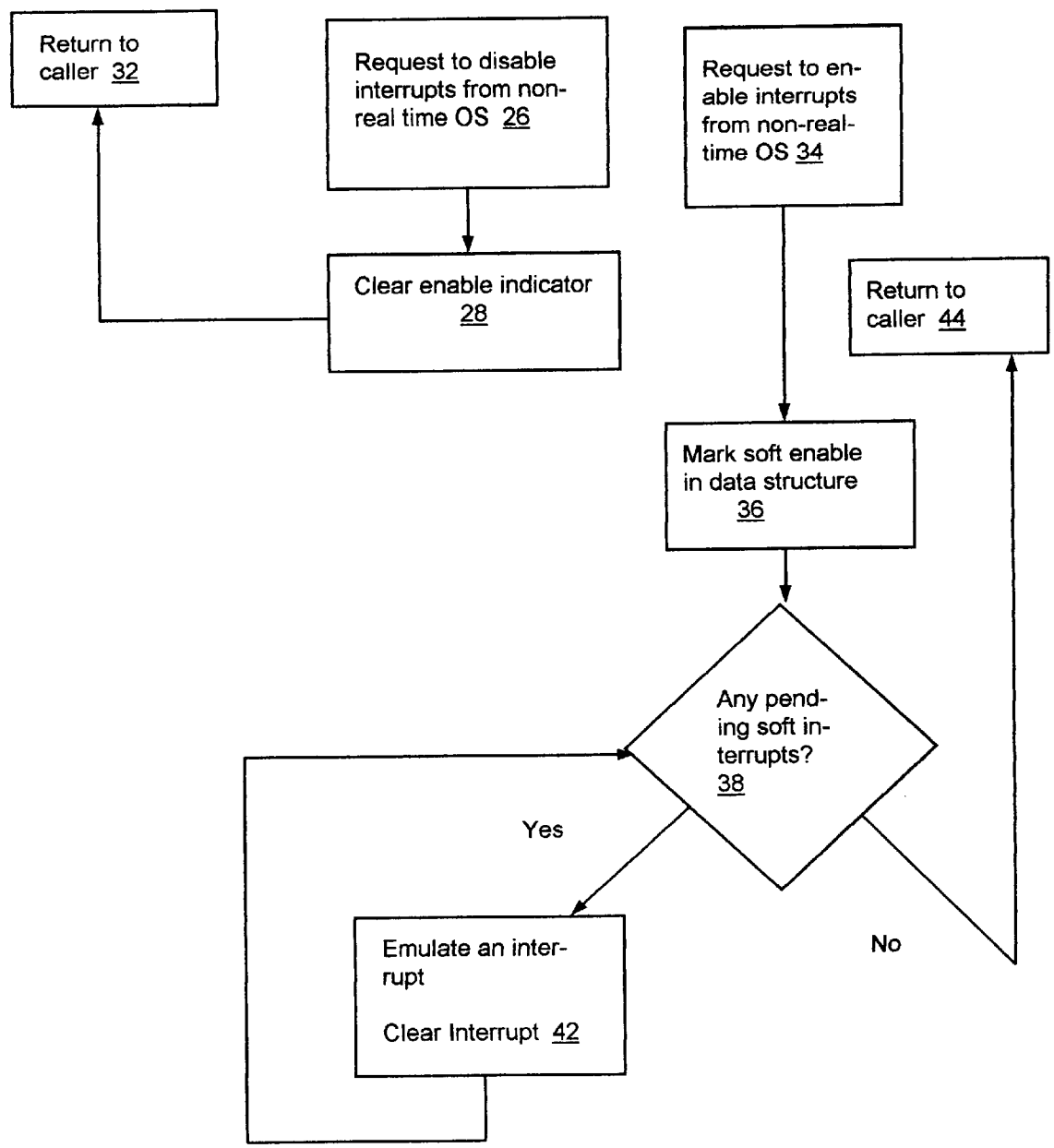
FIG. 1B is a software flow diagram for additional routines used in the flow diagram shown in FIG. 1A

As seen in FIG. 1B, when the general purpose operating system attempts to enable hardware interrupts 34, the enabled indicator is set 36 and the pending indicator is checked 38. If an interrupt is pending, than an interrupt is emulated 42. If no software interrupts are pending, the request is returned 44. If the general purpose operating system attempts to disable hardware interrupts 26, the enabled indicator is cleared 28 and the request is returned 32. The result is that the real-time tasks are never disabled from the executing, while the general purpose operating system requires only very minimal modifications.

Thus, a form of emulator is the following routines, where the general purpose operating system uses the routines disable and enable to turn interrupts on and off, and also uses a routine mask to selectively enable and disable interrupts per/device:

```
Soft_Enable 1:  sets a flag indicating that soft interrupts are enabled
Soft_Enable 2:  sets a flag indicating that interrupts are enabled and
                then processes pending soft interrupts.
Soft_Disable:   sets a flag indicating that soft interrupts are disabled
Soft_MaskOff:   passes a device or interrupt number, sets a flag to
                disable soft interrupts from that device or interrupt
                number
Soft_MaskOn     passes a device or interrupt number, sets a flag to
                enable soft interrupts from that device or interrupt
                number
LowLevelHandler (per hardware interrupt):

If interrupt is handled by real time handler
        Then pass control to that handler
    When the real-time handler, if any, completes operation
    If interrupt is handled by soft handler or is shared
        AND no realtime task if active
            AND soft interrupts are enabled
    Then mark soft interrupts disabled and pass control to soft handler
    Else save interrupt information and set PendingFlag
```

This routine works with minor modifications for systems that set processor levels instead of simply turning interrupts on and off.

In a particular embodiment of the present invention as discussed below, the process is applied to the Linux operating system, a UNIX-derivative operating system that is publicly available from a variety of sources including numerous internet sites. See, e.g., http://www.ssc.com/linux/resources/apps.html. As used herein, Linux interacts with a software emulation of the interrupt control hardware. The emulation supports the synchronization requirements of the Linux kernel while preventing Linux from disabling interrupts. Interrupts that are handled by Linux are passed through to the emulation software after any needed real-time processing completes. If Linux has requested that interrupts be disabled, the emulation software simply marks the interrupts as pending. When Linux requests that interrupts be enabled, the emulation software causes control to switch to the Linux handler for the highest priority pending interrupt. Linux is then able to provide sophisticated services to the real-time system without increasing interrupt latency.

A virtual machine layer has been advanced as a technique for making UNIX real-time as far back as 1978 (H. Lycklama et al., "Unix time-sharing system: The MERT operating system," Bell System Technical Journal, 57(6) :2049–2086 (1978)). But the present system emulates only a specific hardware component—interrupt control. Linux is able to otherwise directly control the hardware both for run-time efficiency and in order to minimize the need for modifications to the Linux kernel. The real-time executive that acts as the 0-level operating system does not provide any basic services that can be provided by Linux. Instead, the real-time executive is intended to provide services that Linux cannot provide. Thus, the real-time executive does not provide network services or virtual memory or access to a file system.

One goal of this invention was to develop a Linux kernel that would support real-time control of scientific instruments. The limitations of standard time-shared operating systems for this purpose include unpredictability of execution and high interrupt latency. General purpose time-shared operating systems have schedulers that are intended to balance response time and throughput. As a result, the execution of any process depends in a complex and unpredictable fashion on system load and the behavior of other processes. These problems are compounded in Linux, and most other UNIX derivatives, because kernel mode operation is non-preemptable and because disabling interrupts is used as the primary means of synchronization.

Low interrupt handling latency is critical for any real-time operating system. But interrupt latency is high in Linux. On a 120 MHz Pentium-based PC (Pentium is a trademark of Intel Corp.), up to 400 $\mu$sec latency has been measured for handling "fast" Linux interrupts. It has been reported that the Linux console driver disables interrupts for as long as several milliseconds when switching virtual consoles. Clearly, a frame-buffer that must be emptied every millisecond is then beyond the capabilities of the system, and this timing requirement is among the least demanding.

The fundamental limits for real-time processing are determined by the hardware. For example, a test system for running the present system requires a time of approximately 3.2 $\mu$sec for setting a bit on the parallel port. Obviously, this does not support a requirement for a data rate of over 280 KHz, regardless of the operating system. Similarly, the minimal interrupt latency is bounded by the hardware interrupt processing time. On a Pentium processor, at least 61 cycles are needed to enter and exit the interrupt, and some time is also needed for the interaction with the interrupt controller. Devices that need more rapid response or more precise timing call for dedicated, or at least different, hardware. But modern PC hardware is capable of handling the real-time requirements of a wide range of devices.

The current version of RT-Linux is a modification of Linux 2.1 and 2.0 for Intel x86 based uni-processors and multi-processors. Efforts are currently underway to move to a 2.0 Linux kernel and to port the system to other processor architectures, including the IBM/Motorola PowerPC and DEC Alpha. The test system has a 120 MHz Pentium processor, a 512 KB secondary cache and 32 MB of main memory. All I/O devices, other than the video display and keyboard are DMA devices. Non-DMA controllers for mass storage devices are difficult to integrate into a real-time control system.

A simple priority-based preemptive scheduler is currently used in RT-Linux. It is implemented as a routine that chooses among the ready process the highest-priority one and marks it as a next process to execute. Tasks give up the processor voluntarily, or are preempted by a higher priority task when its time to execute comes.

Typically, there is a tradeoff between the clock interrupt rate and the task release jitter. In most systems, tasks are resumed in the periodic clock interrupt handler. High clock interrupt rate ensures low jitter, but, at the same time, incurs much overhead. Low interrupt rate causes tasks to be resumed either too early or too late. In RT-Linux this tradeoff is resolved by using a one-shot timer instead of a periodic clock. Tasks are resumed in the timer interrupt handler precisely when needed.

Note that all task resources are statically defined. In particular, there is no support for dynamic memory allocation. The basic approach is that any sophisticated services that require dynamic memory allocation would be moved into Linux processes. In keeping with this approach the real-time kernel itself is not preemptable.

Since the Linux kernel can be preempted by a real-time task at any moment, no Linux routine can safely be called from real-time tasks. However, some communication mechanism must be present. Simple FIFOs are used in RT-Linux for moving information between Linux processes or the Linux kernel and real-time processes. In a data-collecting application, for example, a real-time process would poll a device, and put the data into a FIFO. Linux processes can then be used for reading the data from the FIFO and storing it in the file, or displaying it on the screen. Currently, interrupts are disabled when a RT-FIFO is accessed. Since data are transmitted in small chunks, this does not compromise a low response time. Other approaches, notably using lock-free data structures, are also possible.

Modifications to the Linux kernel are primarily in three places:

The cli routine to disable interrupts is modified to simply clear a global variable controlling soft interrupt enable.

The sti routine to enable interrupts is modified to generate emulated interrupts for any pending soft interrupts.

The low-level "wrapper" routines that save and restore state around calls to handlers have been changed to use soft return from interrupt code instead of using the machine instruction.

Figure 2:
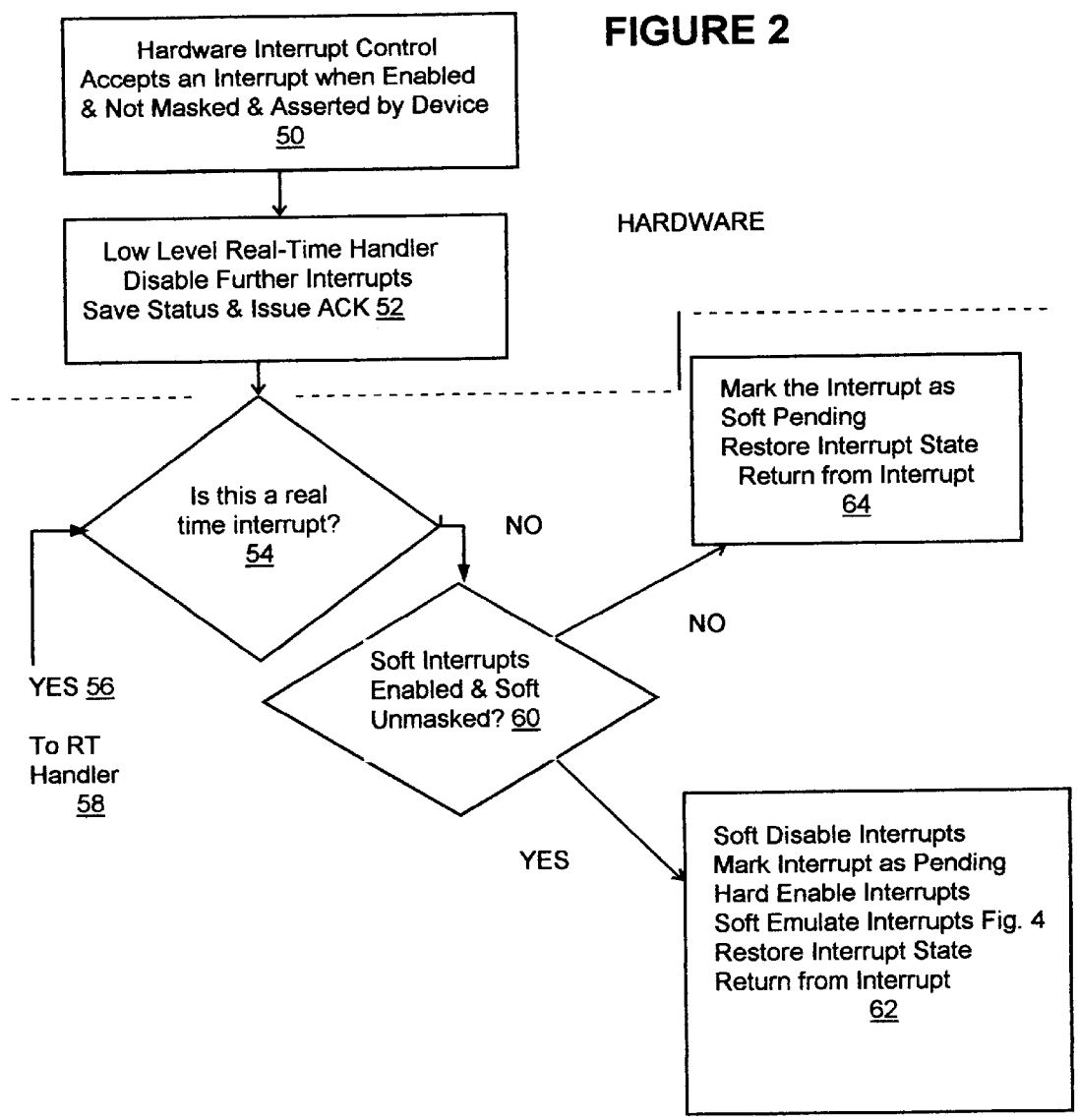
FIG. 2 is a software flow diagram for application of the present invention to the LINUX operating system.

FIGS. 2–6 are flow diagram depictions of the process of the present invention from which a person skilled in the art could form a suitable software routine for integrating a real-time processor with a general purpose operating system. Referring first to FIG. 2, when an interrupt occurs 50, control switches to a real-time handler. The handler does whatever needs to be done in the real-time executive 52; i.e., further interrupts are disabled, the interrupt status is saved, and an acknowledgment (ACK) is issued. The ACK involves clearing the interrupt from the controller so that a later HARD_ENABLE will not trigger a second interrupt from the same signal. But the ACK must not permit the device to generate a second interrupt until it is hard-unmasked. Then the nature of the interrupt is determined 54. If the soft interrupt enable flag is set 56, then the stack is adjusted to fit the needs of the Linux handler, hard interrupts are re-enabled and control is passed, via a soft interrupt table, to the appropriate Linux "wrapper". The "wrapper" saves additional state and calls the Linux handler 58—a program usually written in C language. When the handler returns control to the "wrapper" a soft return from interrupt is executed 60. Soft return 60 from interrupt restores state and then checks to see if any other soft interrupts are pending. If not, a hard return from interrupt is executed 62 so that hard interrupts are re-enabled along a short path whereby real time interrupts can always be accepted. If there are interrupts pending 84 (FIG. 3), then the highest priority one is processed.

Linux is reasonably easy to modify because, for the most part, the kernel code controls interrupt hardware through the routines cli() and sti(). In standard x86 Linux, these routines are actually assembly language macros that generate the x86 cli (clear interrupt bit) and sti (set interrupt bit) instructions for changing the processor control word.

Figure 3:
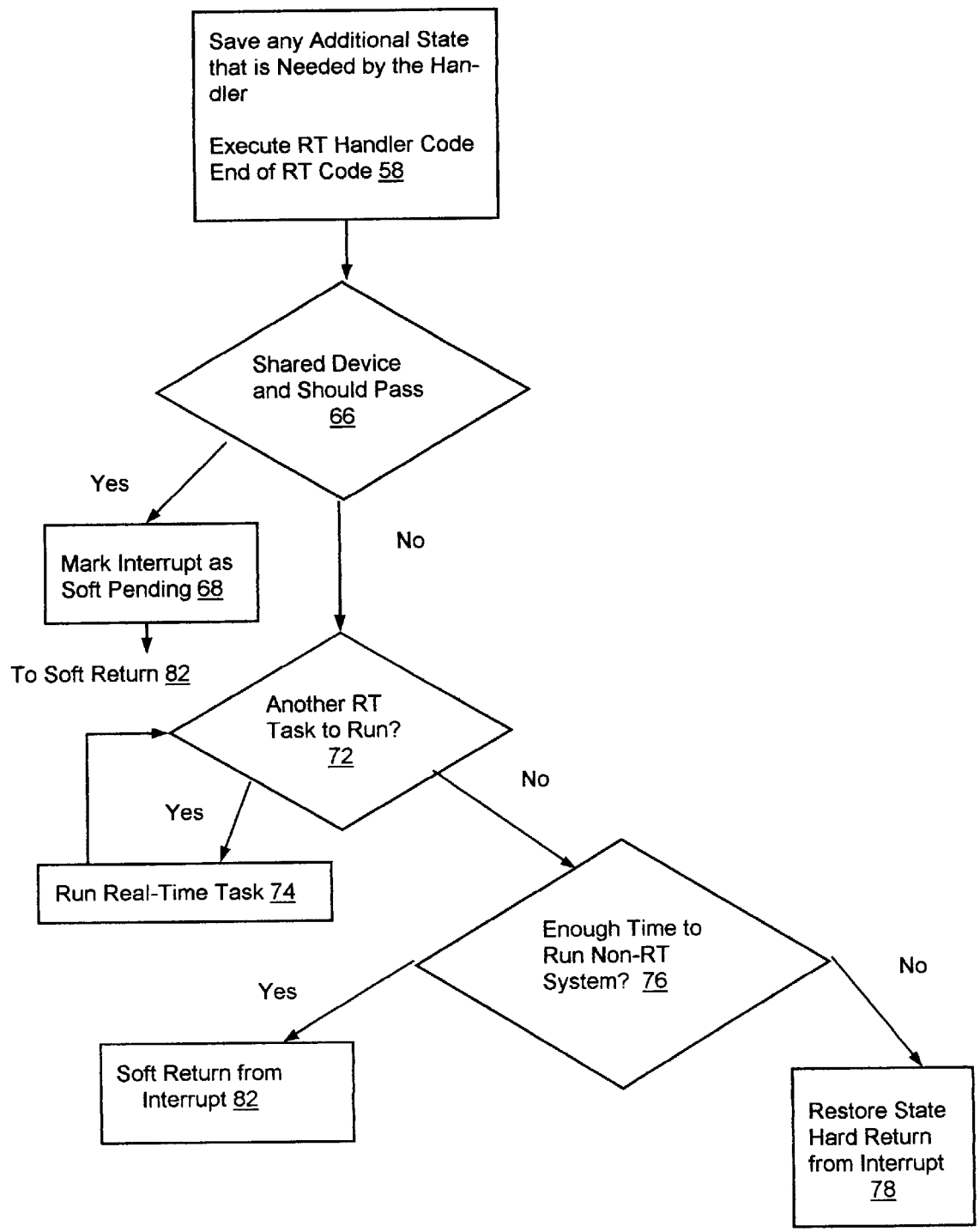
FIG. 3 is a continuation of the software flow diagram shown in FIG. 2.
Figure 4:
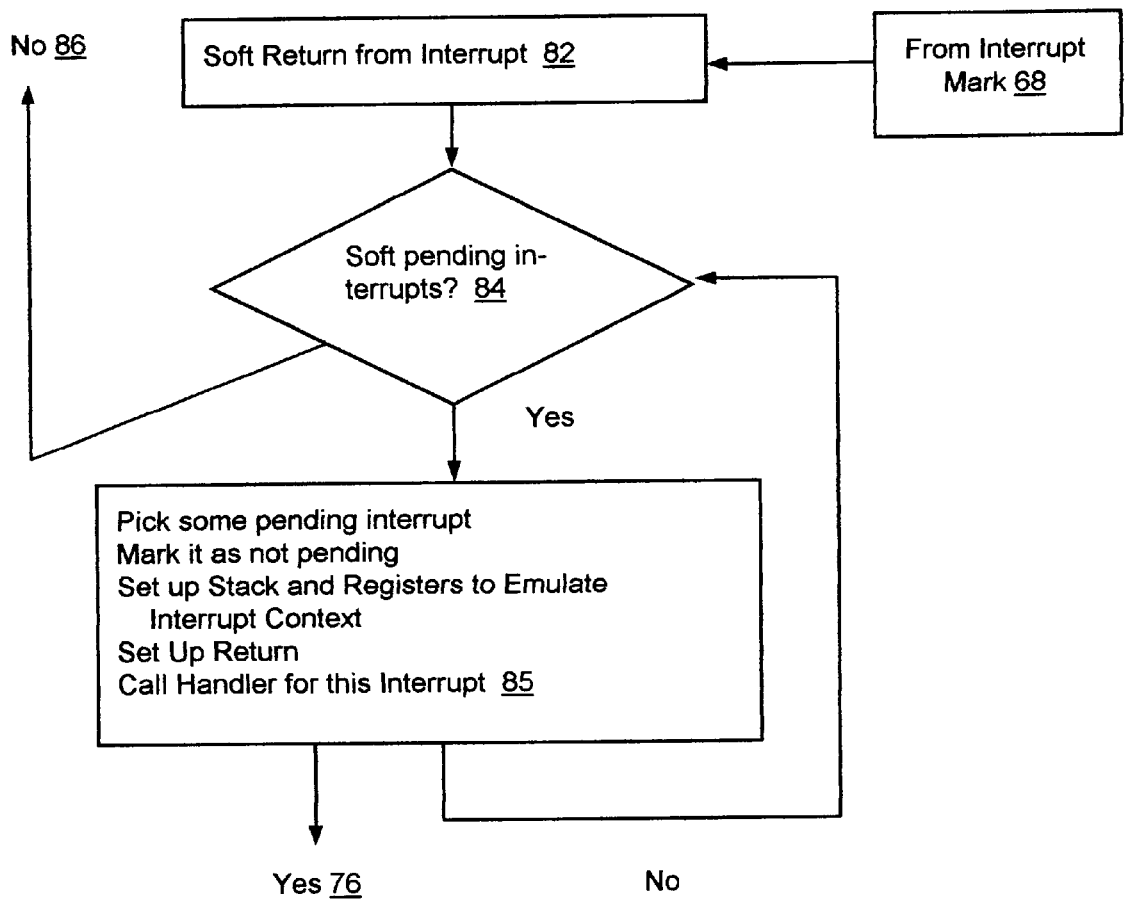
FIG. 4 is a continuation of the software flow diagram shown in FIG. 2.
Figure 5:
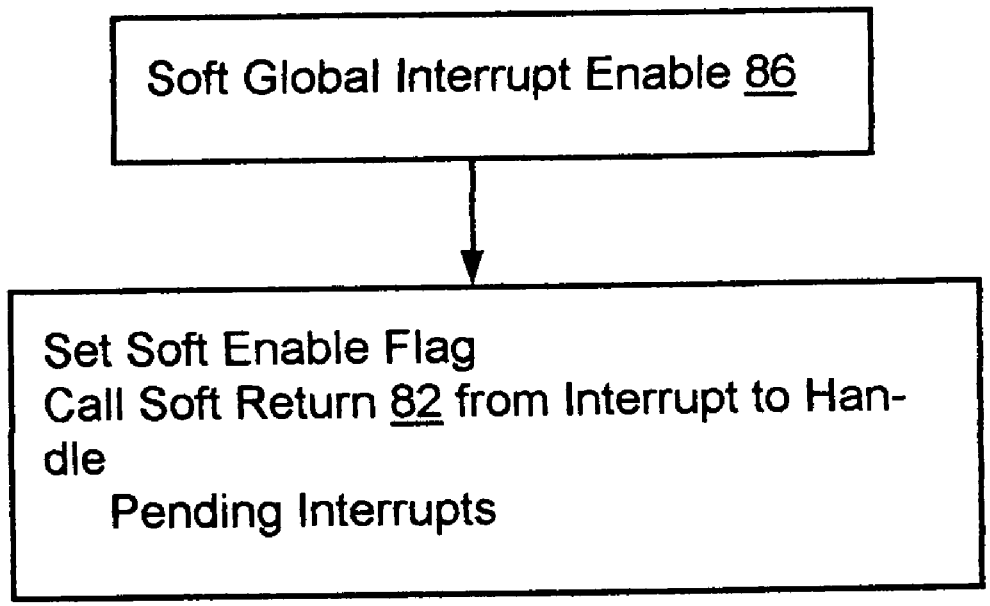
FIG. 5 is a continuation of the software flow diagram shown in FIG. 4.
Figure 6:
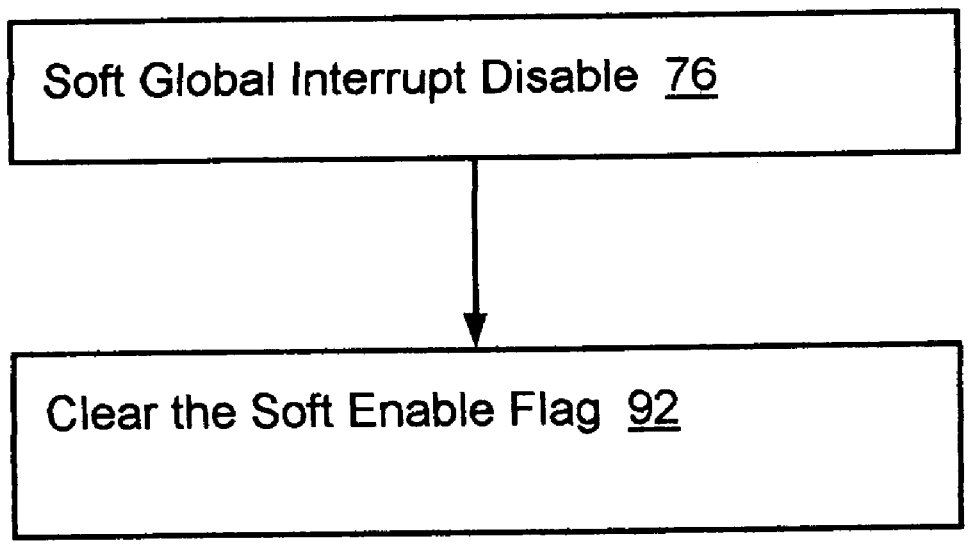
FIG. 6 is a continuation of the software flow diagram shown in FIG. 4.

As shown in FIG. 3, interrupt handlers 58 in the RT-executive perform 66 whatever function is necessary for the selected RT system and then may pass 68 interrupts on to Linux. Since the real-time system is not involved in most I/O, most of the RT device interrupt handlers simply notify Linux. On the other hand, the timer interrupt increments timer variables, determines 72 whether a RT task needs to run, and passes interrupts 74 to Linux only at appropriate intervals.

If software interrupts are disabled, control simply returns 78 through interrupt return (iret). Other wise, control is passed 82 to the soft return from interrupt (S_IRET) 84. Macro 85 (FIG. 4) invokes the software handler corresponding to the interrupt that has the highest priority among pending and not masked ones.

The S_IRET code begins by saving minimal state and making sure that the kernel data address space is accessible. In the critical section surrounded by the actual cli and sti the software interrupt mask 82 is applied to the variable containing pending interrupts, and then looks 84 for the highest-priority pending interrupt. If there are no software interrupts to be processed, software interrupts are re-enabled 88 (FIG. 5), the registers are restored, and the system returns from the interrupt. If there is an interrupt to process 76 (FIG. 6), control is passed to its Linux "wrapper" 92.

Each Linux "wrapper" has been modified to fix the stack so that it looks as if control has been passed directly from the hardware interrupt. This step is essential because Linux actually looks in the stack to see if the system was in user or kernel mode when the interrupt occurred. If Linux believes that the interrupt occurred in kernel mode, it will not call its own scheduler. The body of the wrapper has not been modified, but instead of terminating with an iret operation, the modified wrapper invokes S_IRET. Thus, wrappers essentially invoke each other until there are no pending interrupts left.

On re-enabling software interrupts, all pending ones, of course, should be processed. The code simulates a hardware interrupt. The flags and the return address are pushed onto the stack and S_IRET is used.

Individual disabling/enabling of interrupts is handled similarly.

Thus, Linux has been modified as little as possible in order to accommodate the real-time executive according to the present invention. The real-time executive approach might be used as a basis for significant redesign of Linux and similar operating systems. For example, device drivers often have real-time constraints. If the real-time requirements of the drivers were made explicit and moved into the RT-kernel, then configuration programs could attempt to find a feasible schedule rather than allowing users to find out by experiment whether device time constraints are feasible. It may also be possible to simplify design of the general purpose kernel by giving the emulation a cleaner semantics than the actual hardware.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for running a general purpose computer operating system using a real time operating system, including the steps of:

providing a real time operating system for running real time tasks and components and non-real time tasks;

providing a general purpose operating system as one of the non-real time tasks;

preempting the general purpose operating system as needed for the real time tasks; and preventing the general purpose operating system from blocking preemption of the non-real time tasks.

2. A process according to claim 1, further including the step of providing a software emulator to disable and enable interrupts from the general purpose operating system.

3. A process according to claim 2, wherein the software emulator performs the steps of:

preventing the general purpose operating system from disabling hardware interrupts from hardware operating in real time; and emulating hardware interrupt control to preserve interrupt behavior expected by the general purpose operating system with only minimal changes to the general purpose operating system code.

4. A process according to claim 3, further including the steps of allocating the hardware interrupts to either real-time tasks and components of the real-time operating system or to the general purpose operating system.

5. A process according to claim 4, wherein allocating the hardware interrupts further includes the steps of:

passing control directly to real-time tasks or components when the hardware generates interrupts that are allocated to real-time tasks or to components of the real-time operating system; and passing control to the software emulator when the hardware generates interrupts that are allocated to the general purpose operating system.

6. A process according to claim 2, further including the step of maintaining software interrupt control with the software emulator.

7. A process for running a general purpose computer operating system using a real time operating system, including the steps of:

providing a real time operating system for running real time tasks and components and non-real time tasks;

providing a general purpose operating system as one of the non-real time tasks;

preempting the general purpose operating system as needed for the real time tasks;

preventing the general purpose operating system from blocking preemption of the non-real time tasks;

providing a software emulator to disable and enable interrupts from the general purpose operating system;

marking interrupts as "soft disabled" and not "soft enabled" in response to requests from the general purpose operating system to disable interrupts;

marking interrupts as "pending" and returning control to an interrupted thread of execution in response to hardware interrupts allocated to the general purpose operating system if either the interrupted thread of execution was a real-time task or component of the real-time operating system or if the interrupt has been marked as "soft disabled";

emulating the interrupt in response to hardware interrupts allocated to the general purpose operating system if both the interrupted thread of execution was not a real-time task or component of the real-time operating system and the interrupt has been marked as "soft enabled"; and marking interrupts as "soft enabled" and not "soft disabled" and then emulating any soft enabled interrupts in response to requests from the general purpose operating system to enable interrupts.

8. A process according to claim 7, wherein the software emulator performs the steps of:

preventing the general purpose operating system from disabling hardware interrupts from hardware operating in real time; and emulating hardware interrupt control to preserve interrupt behavior expected by the general purpose operating system with only minimal changes to the general purpose operating system code.

9. A process according to claim 8, further including the steps of allocating the hardware interrupts to either real-time tasks and components of the real-time operating system or to the general purpose operating system.

10. A process according to claim 9, wherein allocating the hardware interrupts further includes the steps of:

passing control directly to real-time tasks or components when the hardware generates interrupts that are allocated to real-time tasks or to components of the real-time operating system; and passing control to the software emulator when the hardware generates interrupts that are allocated to the general purpose operating system.

11. A process according to claim 7, where the step for emulating the interrupt further consists of the steps of:

marking the interrupt as "soft enabled" and not "soft disabled";

passing control to an appropriate interrupt handler of the general purpose operating system; and restoring state after the interrupt handler of the general purpose operating system completes the non-real time task.

* * * * *